United States Patent
Anstey et al.

(10) Patent No.: US 9,241,443 B2
(45) Date of Patent: Jan. 26, 2016

(54) GATE POSITION CONTROL OF ROUND BALE DISCHARGE

(71) Applicant: DEERE & COMPANY, Moline, IL (US)

(72) Inventors: Henry D. Anstey, Ottumwa, IA (US); Timothy J. Kraus, Blakesburg, IA (US)

(73) Assignee: DEERE & COMPANY, Moline, IL (US)

( * ) Notice: Subject to any disclaimer, the term of this patent is extended or adjusted under 35 U.S.C. 154(b) by 84 days.

(21) Appl. No.: 14/208,580

(22) Filed: Mar. 13, 2014

(65) Prior Publication Data

US 2015/0257340 A1  Sep. 17, 2015

(51) Int. Cl.
| | |
|---|---|
| *G06F 7/70* | (2006.01) |
| *G06F 19/00* | (2011.01) |
| *G06G 7/00* | (2006.01) |
| *G06G 7/76* | (2006.01) |
| *A01F 15/08* | (2006.01) |
| *A01F 15/07* | (2006.01) |

(52) U.S. Cl.
CPC ............. *A01F 15/0883* (2013.01); *A01F 15/07* (2013.01)

(58) Field of Classification Search
None
See application file for complete search history.

(56) References Cited

U.S. PATENT DOCUMENTS

2007/0175198 A1 *  8/2007  Viaud et al. ................. 56/341
2009/0107102 A1 *  4/2009  Biziorek ...................... 56/341
2011/0023732 A1 *  2/2011  Herron ......................... 100/40

* cited by examiner

*Primary Examiner* — Yonel Beaulieu
*Assistant Examiner* — Lail Kleinman

(57) ABSTRACT

An agricultural round baler has an electronic control unit (ECU), a bale diameter sensor, a gate position sensor, and an electro-hydraulic valve that controls the flow to the gate lift cylinder. The ECU determines the height to which the gate must be raised based on the bale diameter. When the gate reaches the desired height, the ECU closes or restricts the electro-hydraulic valve for a brief period of time thereby momentarily slowing or stopping gate the gate. Momentarily trapping the bale between the gate and ground allows the bale to come to rest before the bale is released from the baler. The gate can then be fully opened so that the tractor and baler can be moved clear of the bale before closing the gate.

20 Claims, 3 Drawing Sheets

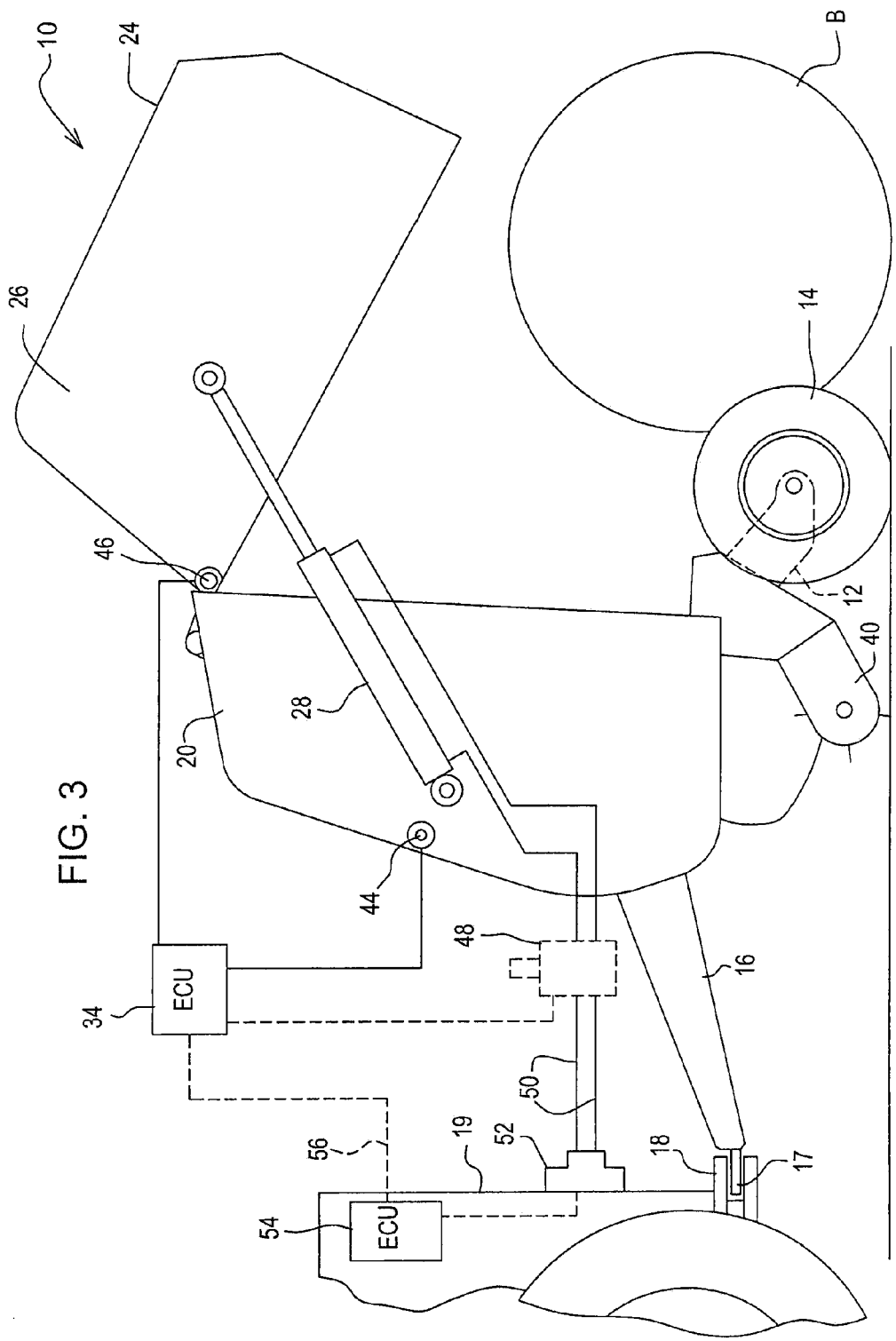

GATE POSITION CONTROL OF ROUND BALE DISCHARGE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

The disclosure relates generally to agricultural balers. More particularly, the disclosure relates to agricultural balers that produce large cylindrical bales, commonly referred to as round balers. Specifically, the disclosure relates to a round baler equipped with a gate position control system to control bale discharge.

BACKGROUND OF THE DISCLOSURE

In various agricultural and other settings, it may be useful to form bales of crop (and other) material. The formed bales may have various sizes and, in certain applications, may have generally circular cross-sections. Various machines or mechanisms may be utilized to gather material (e.g., from a windrow along a field) and process it into bales. In order to create round bales, for example, a round baler may travel along a windrow of cut crop material gathering the material into a generally cylindrical baling chamber. Various systems of the baler may compress, wind and wrap the crop material into bales. Various mechanisms may then be used to eject the completed bales from the baler.

Since the ejected bale is round, it is prone to rolling. This is particularly a problem associated with baling round bales on hillsides in which case the bale can roll considerably, possibly causing damage to the bale, nearby crop and equipment or other surroundings. Further, conventional round balers may impart a rolling motion to the ejected bales by virtue of the bales being dropped from the baler at a location several inches above the ground and/or being ejected while the baler is still in motion (e.g., before the tractor has completely come to a stop).

SUMMARY OF THE DISCLOSURE

The present disclosure provides an agricultural round baler with gate position discharge control as well as a computer-implemented method for controlled discharge of round bales.

In particular, one aspect of the disclosure provides an agricultural round baler having a bale discharge gate, a gate actuator for moving the gate, a gate position sensor and an ECU operatively connected to a bale diameter sensor and a gate position sensor. The ECU is configured to calculate a minimum height that the gate must be raised to allow a completed bale to drop to the ground based upon a bale diameter signal from the bale diameter sensor. The ECU is also configured to monitor a gate position based upon a signal from the gate position sensor. The ECU is further configured to control the flow of hydraulic fluid to the gate actuator and one of momentarily slowing or stopping the flow of hydraulic fluid to the actuator when the gate reaches the minimum height.

Another aspect of the disclosure provides a computer-implemented method for managing a gate position to control bale discharge from an agricultural round baler having a gate which can include the steps of: determining, by one or more computing devices, a minimum height that the gate must be raised to allow a completed bale to drop to the ground; raising, under control of the computing device(s), the gate to the minimum height; and at least one of momentarily slowing or stopping, under the control of the computing device(s), the gate as the bale drops to the ground. The method can further include: fully opening the gate; moving the baler to allow the gate to close; and closing the gate, all under control of the computing device(s).

Yet another aspect of the disclosure provides a computer-implemented method for managing a gate position to control bale discharge from an agricultural round baler having a gate and actuators for opening the gate, in which the method includes the steps of: incrementally raising, under control of one or more computing device(s), the gate as a bale is discharged from the baler by intermittently stopping and starting the actuators for opening the gate.

The details of one or more embodiment and implementations are set forth in the accompanying drawings and the description below. Other features and advantages will become apparent from the description, the drawings, and the claims.

BRIEF DESCRIPTION OF THE DRAWINGS

The subject matter of the disclosure will be described in more detail below with reference to the accompanying drawings wherein:

FIG. 3 is the round baler of FIG. 1 depicted with the gate in an open position.

DETAILED DESCRIPTION

Figure 1:
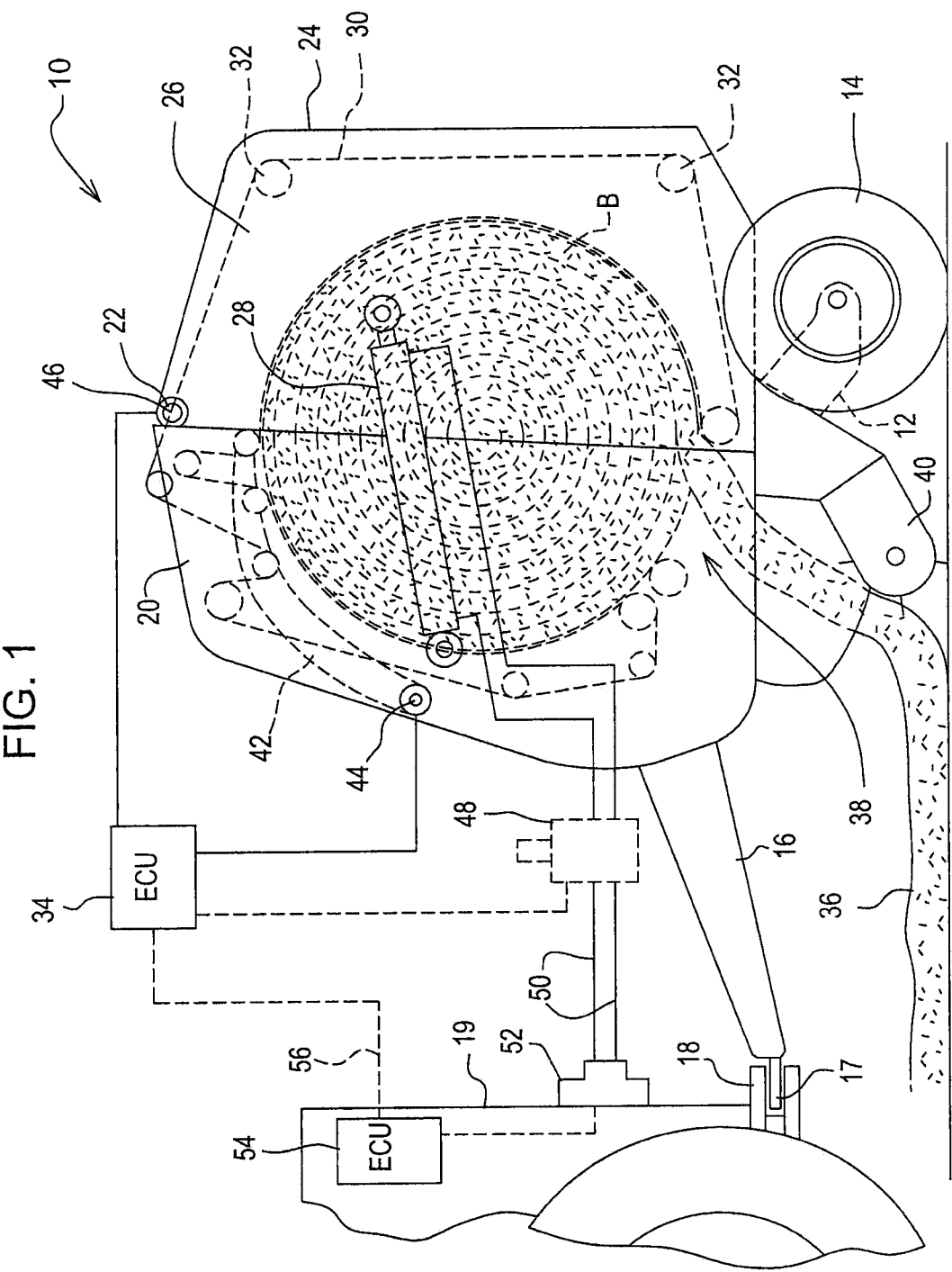
FIG. 1 is a partially schematic side view of an agricultural round baler employing a gate position control system depicted with the gate in a closed position.

The following describes one or more example embodiments and implementations of the disclosed round baler assembly and method, as shown in the accompanying figures of the drawings described briefly above. Various modifications to the example embodiments may be contemplated by one of skill in the art.

As noted above, it may be useful in various circumstances to gather loose material, such as cut crop material, into compacted bales. In certain embodiments, such material may be gathered and compacted into generally cylindrical bales. This may be accomplished by way of various types of round balers. For example, in certain round balers, cut crop (or other) material may be gathered from windrows along a field and may be passed into a baling chamber where the gathered material is compressed, spiral wound and wrapped into bales of various size and density, depending on the configuration of the baler.

In this and other operations, it may be necessary to gather and process the material and discharge the bale on unlevel terrain, or otherwise during or after a rolling motion has been imparted to the bale (e.g., ejection of the bale from a height above ground and/or while the baler is in motion). It may be also be desired to prevent the bale from rolling, for example, to accurately space apart and locate the bales for later retrieval or to avoid contact of the bale with nearby objects.

In inclined discharge applications, or other applications in which a rolling motion is imparted to the round bale, it has been found that if a bale is momentarily stopped after being discharged from a baler, the bale remains in place and the tendency to roll is reduced. Momentarily stopping the bale can be accomplished by opening the gate of the round baler far enough to allow the bale the fall to the ground, and then momentarily stopping the gate when the bale falls to the ground such that the bale is "trapped" between the gate and the ground. The operator can then continue to open the gate to the fully open position.

The height to which the gate is opened to trap the bale can be governed by the bale diameter such that the larger the bale diameter, the higher the gate must be opened. Various manual and automated techniques can be employed to determine bale diameter. For example, an onboard controller, such as a dedicated electronic control unit ECU) or a tractor or baler master controller, can be operatively connected to one or more sensors, such as a bale diameter sensor and a gate position sensor, which provide inputs processed by the controller to operate a gate actuation system. The gate actuation system can be, for example, a dedicated (or a machine platform) electronic, pneumatic, or hydraulic control system. Thus, the controller can receive input signals of the diameter of the bale as it is formed, as well as input signals of the position of the gate, such that in executing an ejection cycle to discharge the bale form the baler the controller can operate a control valve to slow, pause or step the movement of the gate, while the bale is being, or after the bale has been, dropped to the ground. In effect, the controller can use the actuation system to impart a slowing, holding or anti-roll force to the discharged bale, for example, by opening the gate to a position that results in the discharged bale contacting the gate as or after it hits the ground. By effecting this cycle while the baler is stopped further aids in ceasing the movement of the discharged bale.

In certain embodiments, an agricultural round baler is provided with an electronic control unit (ECU), a bale diameter sensor, a gate position sensor, and a electro-hydraulic valve that controls the flow to the gate lift cylinder. The ECU determines the height to which the gate must be raised based on the bale diameter. When an operator activates the Selective Control Valve (SCV) of a tractor to lift the gate, hydraulic fluid flows from the tractor through the electro-hydraulic valve to the gate cylinder which opens the gate. When the gate reaches the desired height, the ECU closes or restricts the electro-hydraulic valve for a brief period of time thereby momentarily stopping or slowing hydraulic fluid flow to the gate cylinder. This stops or slows the gate thereby trapping the bale within the confines of the baler and the ground. This can be achieved by the gate contacting the bale directly to press it against the ground, or simply by positioning the gate to constraining its movement in the roll direction without necessarily holding it against the ground. Trapping the bale in this manner allows the bale to come to rest before the bale is "released" from the baler. The ECU then opens the electro-hydraulic valve allowing hydraulic fluid to flow to the cylinder until the gate reaches its fully open position. When the gate reaches its fully open position, the operator moves the tractor and baler forward, far enough such that the bale is not in the path of the gate, and then closes the gate by moving the SCV of the tractor.

In other embodiments the ISO bus system controls the flow of hydraulic fluid from the tractor to momentarily stop or slow the gate. Use of the ISO bus system to directly control the flow of hydraulic fluid from the tractor eliminates the need for the electro-hydraulic valve and the function of the system is otherwise the same as that described above.

Figure 2:
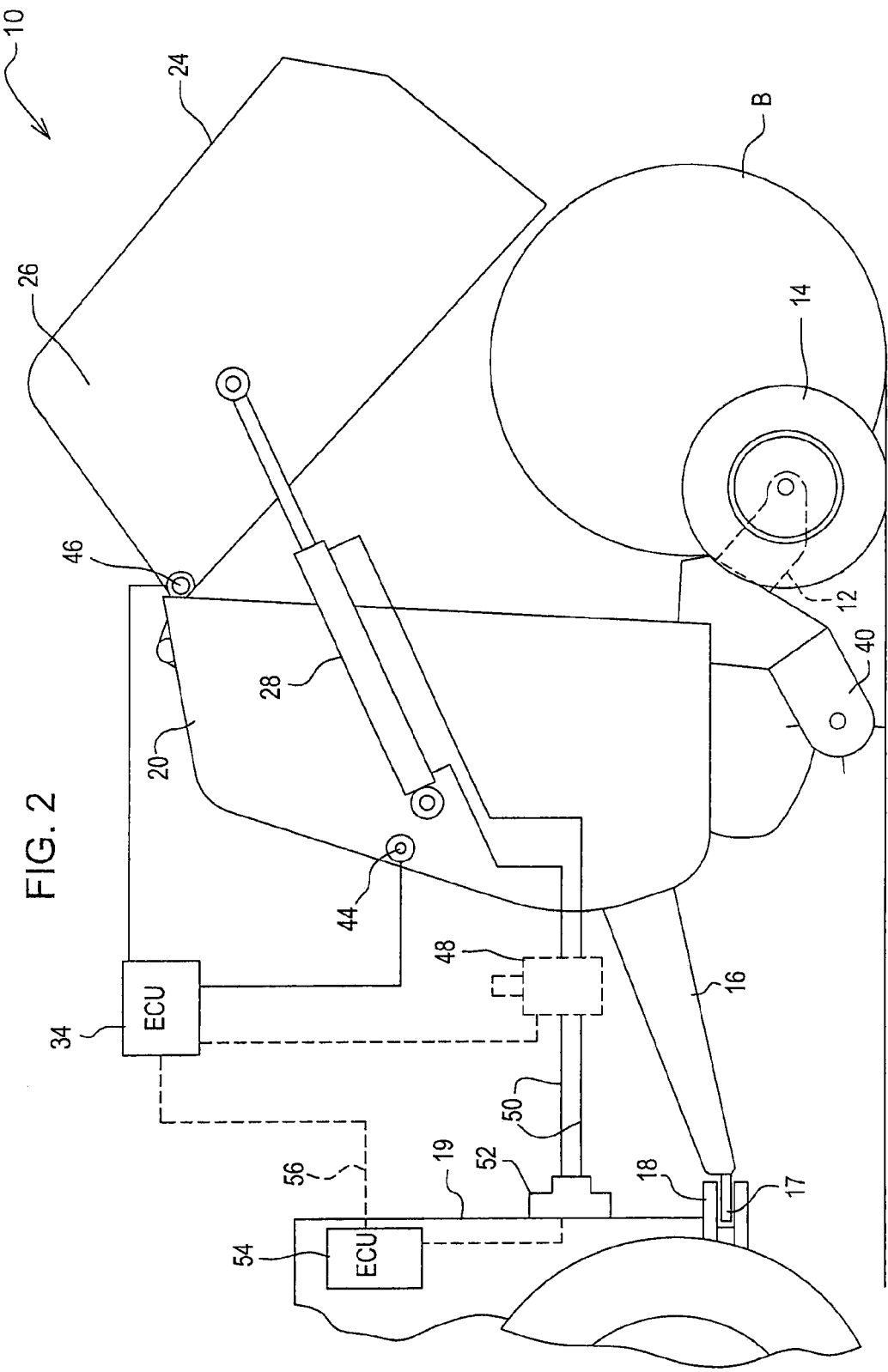
FIG. 2 is the round baler of FIG. 1 depicted with the gate in a partially closed position.

With reference now to FIGS. 1-3, an agricultural round baler 10 has a main frame 12 supported on a pair of ground wheels 14. A draft tongue 16 has a rear end joined to the frame 12 and has a forward end defined by a clevis arrangement 17 adapted for being coupled to the drawbar 18 of a tractor 19 (not fully shown). A pair of upright side walls 20 are fixed to the main frame 12 and define forward regions of opposite side walls of a baling chamber. Mounted for pivoting about a lateral pivot arrangement 22 located at an upper rear location of the side walls 20 is a discharge gate 24 including opposite upright side walls 26, which define opposite sides of a rear region of the baling chamber. A gate cylinder arrangement 28 is coupled between the main frame 12 and the side walls 26 of the discharge gate 24 and is selectively operable for moving the discharge gate 24 between a lowered baling position and an opened discharge position. Baler 10 as shown is of a variable size chamber design and thus comprises a plurality of longitudinally extending side-by-side belts 30 supported on a plurality of rollers 32 (only a few of which are shown). A bale forming chamber is defined by the sidewalls 20, 26, the rollers 32 and belts 30. At least one electronic control unit (ECU) 34 is provided for electronically controlling the functions of the baler 10. The ECU 34 is configured to receive signals from various sensors on the baler for example to determine bale diameter, bale shape, bale weight, etc. and for initiating various baler functions such as the tying or wrapping cycle, bale ejection, opening the gate etc.

In its general operation the baler 10 is attached to tongue 16 and drawn through a field by the tractor 19. Crop material 36 is fed into a crop inlet 38 of the bale forming chamber from a windrow of crop on the ground by a pickup 40. In the baler 10, the crop material 36 is rolled in spiral fashion into cylindrical bale B. Upon completion, the bale B is wrapped with appropriate wrapping material (e.g., net or twine) and is discharged by actuation of gate cylinders 28 that open gate 24 permitting the completed bale B to be discharged from the baler 10 onto the ground. As mentioned previously, the baler 10 illustrated is a variable chamber design wherein crop is rolled up in a spiral fashion in a nip formed between oppositely moving adjacent loops of belts 30. The space between adjacent loops of belts 30 grows as the forming bale B grows larger. Accordingly, a belt tensioning device 42 is provided to take up slack in the belts 30 as needed. Thus the position of the tensioning device 42, at any given time, is an indication of the size of the bale B at that time. A bale diameter sensor 44 in the form of a potentiometer is affixed to the pivot point of the tensioning device 42 and thus provides an electrical signal correlating with bale diameter to the ECU 34. The ECU 34, via appropriate logic, can then translate the signal into meaningful bale size data that can be communicated to an operator by way of an appropriate display device (not shown).

In addition to providing an indication of bale size to the operator, the ECU 34 can be adapted to utilize bale diameter data for other purposes such as triggering a wrapping cycle, opening the discharge gate, initiating bale discharge, or to control the application of preservative to the bale. The baler illustrated is an example of a variable chamber baler, however, it should be understood that the baler could be of a fixed chamber design.

The description thus far has been directed to the construction and operation of a conventional round baler. The description that follows describes the improvements to such a baler as contemplated by this disclosure. More particularly, a gate position sensor 46 is provided. As shown the gate position sensor 46 is associated with the pivot arrangement 22 of the gate 24 and thus could be in the form of a rotary potentiometer. It is however, contemplated that a variety of other suitable arrangements of sensors could be used to sense the position of the gate 24. The 25 gate position sensor 46 is in wired or wireless communication with the ECU.

Additionally an electro-hydraulic control valve 48 is interposed in the hydraulic lines 50 connecting the gate cylinder 28 with an SCV 52 of the tractor 19. The electro hydraulic control valve 48 is electrically activated according to signals from the ECU 34 and is configured to control the flow of hydraulic fluid between the SCV 52 and the gate cylinder 28.

In operation the ECU 34 receives signals from the bale diameter sensor 44 and, based upon the bale diameter, determines a minimum height to which the gate 24 must be raised to allow the bale B to drop to the ground. Alternatively the ECU can be pre-programmed with a known bale diameter thus eliminating the need for a bale diameter sensor. As illustrated in FIG. 1 the gate 24 is in the closed position and a nearly finished bale B is in the bale chamber. When the SCV 52 of the tractor is either automatically or manually activated to lift the gate 24, hydraulic-fluid flows from the tractor hydraulic system through the electro-hydraulic valve 48 to the gate cylinder 28 which opens the gate 24. When the gate 24 reaches the desired height, the ECU 34 closes or restricts the electro-hydraulic valve 48 for a brief period of time thereby momentarily stopping or slowing flow of hydraulic fluid to the gate cylinder 28. This stops or slows the gate 24 from opening further thereby trapping the bale B within the confines of the baler 10 and the ground, as shown in FIG. 2. Trapping the bale B in this manner allows the bale B to come to rest before the bale B is fully released from the baler 10. The ECU 34 then opens the electro-hydraulic valve 48 allowing hydraulic-fluid again to fully flow to the gate cylinder 28 until the gate 24 reaches it fully open position as shown in FIG. 3. When the gate 24 reaches its fully open position, the baler 10 is moved forward, far enough that the bale B is not in the path of the gate 24 as it closes. The gate 24 is then closed by activation of the SCV 52 back to the position illustrated in FIG. 1.

Alternatively, the flow of hydraulic fluid from the SCV 52 to the gate cylinder 28 can be directly controlled through communication between the baler ECU 34 and an ECU 54 of the tractor via an ISO Bus 56. In this alternative embodiment the baler ECU 34 receives signals from the bale diameter sensor 44 and based upon the bale diameter, determines a minimum height to which the gate 24 must be raised to allow the bale B to drop to the ground. When the SCV 52 of the tractor is automatically or manually activated to lift the gate 24, hydraulic-fluid flows from the tractor hydraulic system through the electro-hydraulic valve 48 to the gate cylinder 28 which opens the gate 24. When the gate 24 reaches the desired height, the baler ECU 34 communicates with the tractor ECU 54 via the ISO Bus 56 to momentarily stop or slow the flow of hydraulic fluid to the gate cylinder 28. This stops or slows the gate 24 from opening further thereby "trapping" the bale B within the confines of the baler 10 (and the ground), as shown in FIG. 2 and described above. The baler ECU 34 then communicates with the tractor ECU 54 via the ISO Bus 56 to again allow hydraulic-fluid to flow to the gate cylinder 28 until the gate 24 reaches it fully open position as shown in FIG. 3. When the gate 24 reaches its fully open position, the baler 10 is moved forward, far enough that the bale B is not in the path of the gate 24 as it closes. The gate 24 is then closed by activation of the SCV 52 back to the position illustrated in FIG. 1.

Accordingly, the communication between the baler ECU 34 and the tractor ECU 54 facilitates the direct control of hydraulic fluid flow through the SCV 52 without the need for the electro-hydraulic control valve of the first embodiment.

With both of the embodiments described above it is alternatively contemplated that rather than stopping or slowing the gate at or near a pre-determined height it would be possible to intermittently stop or slow flow of hydraulic fluid to the gate cylinders using the electro-hydraulic valve to allow the gate to open in incremental steps of a few degrees at a time. Doing so eliminates the need to determine a bale diameter or minimum height, yet ensures that the bale will be trapped at some point during the opening of the gate.

As will be appreciated by one skilled in the art, various aspects of the disclosed subject matter may be embodied as a computer-implemented method, a system, or a computer program product. Accordingly, certain embodiments may be implemented entirely as hardware, entirely as software (including firmware, resident software, micro-code, etc.) or as a combination of software and hardware aspects. Furthermore, certain embodiments may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be non-transitory and may be any computer readable medium that is not a computer readable storage medium and that can communicate, propagate, or transport a program for use by or in connection with an instruction execution system, apparatus, or device.

It will further be understood that certain method steps can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instructions which implement the function/act specified. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The architecture, functionality, and operation of possible implementations of systems, methods and computer program products can be provided according to various embodiments of the present disclosure. In this regard, each process or step may represent a module, segment, or portion of code, which includes one or more executable instructions for implementing the specified logical function(s). Further, in some alternative implementations, the functions noted may occur out of the order noted in this disclosure. For example, two processes described in succession may, in fact, be executed substantially concurrently, or the processes may sometimes be executed in the reverse order, depending upon the functionality involved. It will also be noted that each process or combination of steps can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s).

Accordingly, various implementations other than those explicitly described are within the scope of the claims.

What is claimed is:

1. An agricultural round baler, comprising:
a bale discharge gate;
a gate actuator for moving the gate; and
a control circuit including an ECU operatively coupled to a bale diameter sensor and a gate position sensor;
wherein the ECU is configured to calculate a minimum height that the gate must be raised to allow a completed bale to drop to the ground based upon a bale diameter signal from the bale diameter sensor;
wherein the ECU is configured to monitor a gate position based upon a signal from the gate position sensor; and
wherein the ECU is configured to control the flow of hydraulic fluid to the gate actuator and momentarily slowing or stopping the flow of hydraulic fluid to the actuator when the gate reaches the minimum height.

2. The agricultural round baler of claim 1, wherein the gate actuator is connected via hydraulic lines to a control valve of a tractor.

3. The agricultural round baler of claim 2, wherein an electro-hydraulic control valve is interposed in the hydraulic lines to control flow of hydraulic fluid there through.

4. The agricultural round baler of claim 3, wherein the electro-hydraulic valve is selectively actuated via signals from the ECU.

5. The agricultural round baler of claim 3, wherein the electro-hydraulic valve is actuated via signals from the ECU to one of: momentarily stop flow of hydraulic fluid to the gate actuator when the minimum height is reached; and slow the flow of hydraulic fluid to the gate actuator when the minimum height is reached.

6. The agricultural round baler of claim 2, wherein the ECU is connected via an ISO Bus to a second ECU that controls the flow of hydraulic fluid through the control valve.

7. The agricultural round baler of claim 6, wherein the ECU commands the second ECU to one of stop and slow the flow of hydraulic fluid to the actuator when the minimum height is reached.

8. A computer-implemented method for managing a gate position to control bale discharge from an agricultural round baler, the baler having a gate, the method comprising the steps of:
determining, by one or more computing devices, a minimum height that the gate must be raised to allow a completed bale to drop to the ground;
raising, under the control of the one or more computing devices, the gate to the minimum height; and
at least one of momentarily slowing and stopping, under the control of the one or more computing devices, the gate as the bale drops to the ground.

9. The method of claim 8, wherein the one or more computing devices includes an ECU, and wherein a bale diameter is communicated to then ECU.

10. The method of claim 9, wherein the ECU determines the minimum height that the gate must be raised to allow the completed bale to drop to the ground based upon the diameter of the completed bale.

11. The method according of claim 10, wherein the gate is moved via a hydraulic actuator.

12. The method of claim 11, wherein the hydraulic actuator is actuated by hydraulic fluid from a control valve on a tractor via hydraulic lines to raise and lower the gate.

13. The method of claim 12, wherein an electro-hydraulic valve is placed in the hydraulic lines and is selectively actuated by the ECU to one of stop and slow the flow of hydraulic fluid to the actuator to one of stop and slow the gate when the minimum height is reached.

14. The method of claim 12, wherein the ECU is connected via an ISO bus to a second ECU that controls the flow of hydraulic fluid through the control valve.

15. The method of claim 14, wherein the ECU commands the second ECU to one of stop and slow the flow of hydraulic fluid to the actuator when the minimum height is reached.

16. The method of claim 10, wherein a known diameter of the completed bale is stored in the ECU.

17. The method of claim 10, wherein the diameter of the completed bale is sensed by a bale diameter sensor on the baler.

18. The method of claim 10, wherein the gate is equipped with a gate position sensor that communicates a signal corresponding to gate position to the ECU.

19. The method of claim 8, further including:
fully opening the gate under the control of the one or more computing devices;
moving the baler to allow the gate to close; and
closing the gate under the control of the one or more computing devices.

20. A computer-implemented method for managing a gate position to control discharge of a bale from an agricultural round baler, the baler having a gate, and actuators for controlling the gate position, the method comprising the steps of:
   incrementally raising, under the control of one or more computing devices, the gate for discharging as a bale is discharged from the baler by
      a) initially starting the actuators for raising the gate from a closed position; and then
      b) intermittently stopping and starting the actuators for continuing raising the gate until it arrives at a fully open position, with each stopping and starting step being at an interval wherein a discharged bale will be engaged and stopped by the gate before the gate arrives at a fully open position to prevent the bale from rolling away if the bale is rolling away.

* * * * *